United States Patent [19]

Tadokoro et al.

[11] Patent Number: 5,668,223
[45] Date of Patent: Sep. 16, 1997

[54] POLYURETHANE

[75] Inventors: Toshio Tadokoro, Yokkaichi; Shigeru Murata, Suzuka; Shigeo Hosokawa, Yokkaichi, all of Japan

[73] Assignee: Kyowa Hakko Kogyo Co., Ltd., Tokyo, Japan

[21] Appl. No.: 648,068

[22] PCT Filed: Jun. 7, 1995

[86] PCT No.: PCT/JP95/01126

§ 371 Date: May 20, 1996

§ 102(e) Date: May 20, 1996

[87] PCT Pub. No.: WO96/09334

PCT Pub. Date: Mar. 28, 1996

[30] Foreign Application Priority Data

Sep. 21, 1994 [JP] Japan ................................. 6-226567

[51] Int. Cl.$^6$ ....................................... C08G 18/42

[52] U.S. Cl. ........................ 525/440; 528/80; 528/83
[58] Field of Search ............................. 525/440; 329/83, 329/80

[56] References Cited

FOREIGN PATENT DOCUMENTS

| 545108 | 6/1993 | European Pat. Off. . |
| 4081414 | 3/1992 | Japan . |

*Primary Examiner*—Patricia A. Short
*Attorney, Agent, or Firm*—White & Case

[57] ABSTRACT

The present invention relates to a polyurethane having excellent hydrolysis resistance, weatherability, alkali resistance, etc. Said polyurethane is useful as a material for extrusion molding products such as hoses, tubes, films, sheets, belts, and rolls, a material for injection molding products such as packing materials, mechanical parts, and automobile parts, a material for artificial leathers, and coating materials such as paints, etc.

8 Claims, No Drawings

POLYURETHANE

TECHNICAL FIELD

The present invention relates to a polyurethane having excellent hydrolysis resistance, weatherability, alkali resistance, etc. Said polyurethane is useful as a material for extrusion molding products such as hoses, tubes, films, sheets, belts, and rolls, a material for injection molding products such as packing materials, mechanical parts, and automobile parts, a material for artificial leathers, and coating materials such as paints, etc.

BACKGROUND ART

Polyurethane is produced by reacting a polyester polyol or a polyether polyol with a polyisocyanate, optionally in the presence of a low molecular weight compound such as diol, or diamine. A polyurethane which is produced by using a polyester polyol is inferior in hydrolysis resistance in comparison with a polyurethane which is produced by using a polyether polyol. On the other hand, the polyurethane which is produced by using a polyether polyol has drawbacks in mechanical properties, weatherability, and oil or solvent resistance. Therefore, the use of these polyurethanes is restricted.

A polyurethane which is produced by using a polycarbonate polyol is improved with respect to the faults described above. However, it does not have sufficient cold resistance and is very expensive. Thus its industrial utilization is restricted.

Some polyurethanes produced by using a polyester are known as polyurethanes having relatively good hydrolysis resistance; for example, a polyurethane which is produced by using a polycaprolactone polyol (Polyurethane Resin Handbook, published by Nikkan Kogyo Simbun on Sep. 25, 1987), and polyurethanes which are produced by using branched chain diols such as neopentyl glycol, 2-butyl-2-ethyl-1,3-propanediol (Japanese Published Unexamined Patent Application No. 229918/85), and 3-methyl-1,5-pentanediol (Japanese Published Examined Patent Application No. 54966/92). However, the hydrolysis resistance of these polyurethanes is insufficient for practical use.

It is desired to develop a polyurethane having excellent hydrolysis resistance, weatherability, alkali resistance, etc.

DISCLOSURE OF THE INVENTION

The present invention relates to a polyurethane having a polyester polyol in the molecule, said polyester polyol having a structural unit represented by formula (I):

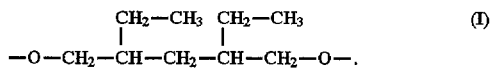

The polyurethane of the present invention can be produced by reacting a polyester polyol with a polyisocyanate.

The polyester polyol can be obtained from 2,4-diethyl-1,5-pentanediol which is a component of the structural unit represented by formula (I) and dicarboxylic acid, according to a known method (e.g., the method described in Japanese Published Unexamined Patent Application No. 101496/73), for example, subjecting them to dehydration polycondensation under heating, optionally under reduced pressure.

As the dicarboxylic acid, succinic acid, adipic acid, azelaic acid, maleic acid, fumaric acid, phthalic acid, etc. are used alone or in combination. A part of 2,4-diethyl-1,5-pentanediol may be replaced with other diols. In this case, the ratio of 2,4-diethyl-1,5-pentanediol in the total diol is 30% or more, preferably 40% or more. Examples of other diols are ethylene glycol, propylene glycol, 1,4-butylene glycol, diethylene glycol, 1,6-hexane glycol, 2-butyl-2-ethyl-1,3-propanediol, 3-methyl-1,5-pentanediol, and 1,4-bis (β-hydroxyethoxy)benzene. When these diols other than 2,4-diethyl-1,5-pentanediol are used, the polycondensation proceeds at random.

The number-average molecular weight of the polyester polyol is 400~8,000, preferably 700~5,000.

Examples of the polyisocyanate are aromatic diisocyanate such as diphenylmethane diisocyanate, and 2,4-tolylene diisocyanate, alicyclic diisocyanate such as isophorone diisocyanate, and aliphatic diisocyanate such as hexamethylene diisocyanate, which are used alone or in combination.

The polyurethane can be produced by known polyaddition techniques for the formation of urethane. That is, the polyester polyol obtained as above and a low molecular weight compound having two or more active hydrogen atoms which is used as a chain extender are uniformly mixed and heated at a temperature of 60° C. Then, the polyisocyanate is added to the mixture in such an amount that the molar ratio of the number of the active hydrogen atoms in the mixture to the number of isocyanate groups becomes 0.95~1:1.05. The resulting mixture is fed to a continuous polymerization apparatus having twin screw with stirring with a rotarymixer for a short time (10~30 seconds) to produce the urethane by continuous random polyaddition. Alternatively, the polyurethane can be obtained via a prepolymer having an isocyanate group at the terminal by first reacting the polyester polyol with the polyisocyanate. These reactions are usually carried out in the absence of a solvent, but may be carried out in a solvent such as dimethylformamide, dimethylsulfoxide, tetrahydrofuran, or toluene.

As the chain extender, diols such as ethylene glycol, propylene glycol, 1,4-butylene glycol, and 1,6-hexane diol, diamines such as propylene diamine, and the like may be used alone or in combination. Further, a denaturant such as a monohydric alcohol having a low molecular weight (e.g. methanol, and ethanol), or a monohydric amine having a low molecular weight (e.g. methyl amine, and ethyl amine) may be added, if necessary.

The weight-average molecular weight of the polyurethane is preferably 60,000~500,000, optimally 80,000~200,000.

When the polymerization reaction is carried out in the absence of a solvent, the obtained polyurethane can be subjected to molding immediately after the polymerization. When unreacted polyisocyanate remains in an amount of 0.2 wt % or more, the polyurethane is subjected to aging at 60°~80° C. for 4~30 hours, if necessary, to complete the reaction and then can be subjected to molding. When the polymerization reaction is carried out in a solvent, a nonsolvent for polyurethane such as a saturated aliphatic hydrocarbon having 6~10 carbon atoms, e.g. hexane, heptane, octane, nonane, and decane, or an alcohol, methanol, and ethanol is added and mixed to flocculate and deposit the polyurethane. The polyurethane is separated by filtration and dried, followed by molding.

The thus obtained polyurethane can be molded by various methods. For example, the molding can be carried out by extrusion molding, injection molding, calendering, and blow molding at 150°~210° C., preferably 160°~200° C. (Handbook of Plastics Processing Technology, Nihon Kogyo Shimbun, Pages 125, 213, 283, 323, published in 1969.)

The hydrolysis resistance, weatherability, and alkali resistance of the polyurethane of the present invention are illustrated below by Test Examples.

Test Example 1 Hydrolysis Resistance

The polyurethane sheets prepared in Example 1 and Comparative Example 1 were immersed in warm water having a temperature of 70° C. for 7 days, 14 days, 21 days or 28 days. Then, each sheet was wiped dry and the breaking strength was measured at 23° C. according to JIS K-7311. The results are shown in Table 1.

TABLE 1

| Composition No. | After 7 days (kg/cm$^2$) (Retention ratio %) | After 14 days (kg/cm$^2$) (Retention ratio %) | After 21 days (kg/cm$^2$) (Retention ratio %) | After 28 days (kg/cm$^2$) (Retention ratio %) |
|---|---|---|---|---|
| 1 | 466.6(95) | 418.4(89) | 390.2(83) | 352.6(75) |
| 2 | 381.2(88) | 346.6(80) | 329.2(76) | 303.2(70) |
| 3 | 447.3(93) | 413.7(86) | 389.6(81) | 351.1(73) |
| 4 | 379.7(84) | 379.7(72) | 257.6(57) | 185.3(41) |
| 5 | 286.8(90) | 258.5(81) | 229.5(72) | 188.0(59) |
| 6 | 342.9(85) | 274.3(68) | 246.1(61) | 209.8(52) |

Note:
Composition Nos. 1–3: Polyurethane sheets prepared in Example 1.
Composition Nos. 4–6: Polyurethane sheets prepared in Comparative Example 1.
(The same shall apply to the other tables.)

As is apparent from Table 1, the polyurethane of the present invention has excellent hydrolysis resistance in comparison with the polyurethane of Comparative Example. It is empirically known that hydrolysis resistance of polyurethane is generally enhanced with the increase of hardness. However, the polyurethane of Composition No. 2, the hardness of which is 78 (Table 6 below), is much superior in hydrolysis resistance to the polyurethanes of Composition No. 4 and Composition No. 6, the hardness of which are 86 and 83, respectively (Table 9 below). Therefore, it is clear that the present invention has a useful effect.

Test Example 2 Weatherability

The polyurethane sheets prepared in Example 1 and Comparative Example 1 were exposed to light using a sunshine carbon weather-o-meter at a black panel temperature of 63° C. for 100 hours or 300 hours (water was sprayed for 18 minutes in 120 minutes). The weatherability was assessed by the retention ratio of breaking strength measured according to JIS K-7311 and the degree of yellowing (increase of yellow index). The results are shown in Table 2.

TABLE 2

| Composition No. | After 100 hours Retention ratio (%) | ΔYI | After 300 hours Retention ratio (%) | ΔYI |
|---|---|---|---|---|
| 1 | 85.4 | 5.4 | 77.1 | 22.5 |
| 2 | 83.8 | 6.0 | 72.0 | 18.0 |
| 3 | 84.0 | 6.1 | 75.3 | 26.7 |
| 4 | 63.2 | 15.9 | 44.6 | 59.2 |
| 5 | 68.0 | 14.4 | 49.8 | 44.8 |
| 6 | 64.0 | 12.9 | 47.3 | 43.6 |

ΔYI: Increase of yellow index
[measured with SZ-Σ80 Type Color Difference Meter, product of Nihon Denshoku Co.]

As is apparent from the table, the polyurethane of the present invention has excellent retention ratio of breaking strength even after 300 hours of exposure to light, that is, more than 70%. Further, the increase of yellow index is slight.

Test Example 3 Alkali Resistance

The polyurethanes prepared in Example 1 and Comparative Example 1 were used to prepare test pieces having a thickness of 2 mm by injection molding under the following conditions.

Injection temperature: 190°~200° C.
Mold temperature: 35° C.
Injection time: 6~8 seconds
Injection pressure: 20 kg/cm$^2$
Holding pressure: 35 kg/cm$^2$ The test pieces were immersed in a 5% aqueous solution of sodium hydroxide at 70° C. for 7 days. Then, the physical properties of polyurethanes were measured by JIS K-7311 and the retention ratio was calculated. The results are shown in Table 3.

TABLE 3

| Composition No. | Retention ratio (%) 100% Modulus | Breaking strength | Ductility |
|---|---|---|---|
| 1 | 93.3 | 82.6 | 106.8 |
| 2 | 98.6 | 80.1 | 108.0 |
| 2 | 99.0 | 81.5 | 107.4 |
| 4 | 84.8 | 60.3 | 110.0 |
| 5 | 87.0 | 65.6 | 110.7 |
| 6 | 85.7 | 62.3 | 109.2 |

As is apparent from the table, the polyurethane of the present invention has excellent alkali resistance and retains more than 80% of the breaking strength after being immersed in a 5% aqueous solution of sodium hydroxide at 70° C. for 7 days.

BEST MODE FOR CARRYING OUT THE INVENTION

Example, Comparative Example and Reference Examples are given below.

EXAMPLE 1

Polyurethanes having the compositions shown in Table 4 were prepared by the continuous polymerization reaction in the absence of a solvent using the polyester polyols obtained in Reference Example 1. The polymerization apparatus and the polymerization conditions are as follows.

Pre-mixing: High speed rotary mixer temperature: 50°~60° C.
Polymerization apparatus: Twin screw extruder L/D=42, about 10 kg/hour
Polymerization temperature: 120° C. at the inlet for raw materials 195 ° C. at the die outlet
Polymerization time: ca. 150 seconds

TABLE 4

| Composition No. | Polyester polyol (kg) | Diphenylmethane diisocyanate (kg) | 1,4-Butylene glycol (kg) |
|---|---|---|---|
| 1 | a: 68.51 | 25.34 | 6.15 |
| 2 | a: 72.70 | 22.40 | 4.90 |
| 3 | b: 68.73 | 25.17 | 6.10 |

The weight-average molecular weight of the products is shown in Table 5. The weight-average molecular weight was measured by gel permeation chromatography with a device for measuring laser light scattering.

TABLE 5

| Composition No. | Weight-average molecular weight |
| --- | --- |
| 1 | 173,000 |
| 2 | 168,000 |
| 3 | 154,000 |

Then, sheets having a thickness of 300μ were prepared using the polyurethanes obtained above by extrusion molding under the following conditions.

Extruder: single screw extruder (40 mm) L/D=28
 compression ratio=1:2.8
Extruding conditions:
 Temperature: $C_1$ : 175° C.
  $C_2$ : 180° C.
  $C_3$ : 180° C.
  $C_4$ : 185° C.
  die: 185° C.
 Screw rotation: 25 r.p.m.

The obtained sheets were allowed to stand at a temperature of 23° C. for 72 hours and the physical properties of the polyurethanes were measured according to JIS K-7311. The results are shown in Table 6.

TABLE 6

| Composition No. | Hardness (JIS A) | 100% Modulus (kg/cm²) | Breaking strength (kg/cm²) | Ductility (%) | Tear strength (kg/cm²) |
| --- | --- | --- | --- | --- | --- |
| 1 | 83 | 76.2 | 470.1 | 540.0 | 91.4 |
| 2 | 78 | 61.3 | 433.2 | 573.0 | 80.6 |
| 3 | 83 | 78.7 | 481.3 | 510.5 | 88.9 |

COMPARATIVE EXAMPLE 1

Polyurethanes having the compositions shown in Table 7 were prepared in the same manner as in Example 1, using the polyester polyols obtained in Reference Example 2.

TABLE 7

| Composition No. | Polyester polyol (kg) | Diphenylmethane diisocyanate (kg) | 1,4-Butylene glycol (kg) |
| --- | --- | --- | --- |
| 4 | c: 68.63 | 25.25 | 6.12 |
| 5 | d: 68.94 | 25.00 | 6.06 |
| 6 | e: 68.90 | 25.04 | 6.06 |

Table 8 shows the weight-average molecular weight of the products, which was measured by the same method as in Example 1.

TABLE 8

| Composition No. | Weight-average molecular weight |
| --- | --- |
| 4 | 186,000 |
| 5 | 171,000 |
| 6 | 147,000 |

Then, sheets having a thickness of 300μ were prepared by the same method as in Example 1 using the polyurethanes obtained above. The sheets were allowed to stand at 23° C. for 72 hours and the physical properties of the polyurethanes were measured by JIS K-7311. The results are shown in Table 9.

TABLE 9

| Composition No. | Hardness (JIS A) | 100% Modulus (kg/cm²) | Breaking strength (kg/cm²) | Ductility (%) | Tear strength (kg/cm²) |
| --- | --- | --- | --- | --- | --- |
| 4 | 86 | 66.3 | 452.0 | 520.0 | 98.6 |
| 5 | 81 | 63.5 | 318.7 | 555.0 | 67.2 |
| 6 | 83 | 64.4 | 403.4 | 552.0 | 83.1 |

REFERENCE EXAMPLE 1

2,4-Diethyl-1,5-pentanediol or a mixture of 2,4-diethyl-1,5-pentanediol (70%) and 1,4-butylene glycol (30%) was heated with adipic acid at 180°~200° C. to cause dehydration polycondensation. When the acid value became 18~20, the pressure was reduced to 10~15 mmHg. When the acid value reached less than 0.05, the reaction was stopped to obtain the desired polyester polyol. Table 10 shows the compositions and Table 11 shows the physical properties of the products. The number-average molecular weight of the polyester polyol was calculated from the hydroxyl value.

TABLE 10

| Composition No. | 2,4-Diethyl-1,5-pentanediol (kg) | 1,4-Butylene glycol (kg) | Adipic acid (kg) |
| --- | --- | --- | --- |
| a | 60.5 | — | 39.5 |
| b | 46.0 | 11.1 | 42.9 |

TABLE 11

| Composition No. | Diol | Acid value (KOH mg/g) | Hydroxyl value (KOH mg/g) | Water content (%) | Number-average molecular weight |
| --- | --- | --- | --- | --- | --- |
| a | 2,4-Diethyl-1,5-pentanediol | 0.01 | 55.8 | 0.013 | 2,010 |
| b | 2,4-Diethyl-1,5-pentanediol (70%) + 1,4-Butylene glycol (30%) | 0.01 | 55.3 | 0.011 | 2,030 |

REFERENCE EXAMPLE 2

1,4-Butylene glycol, 2-butyl-2-ethyl-1,3-propanediol, or neopentyl glycol was subjected to dehydration polycondensation with adipic acid in the same manner as in Reference Example 1 to synthesize polyester polyol. Table 12 shows the compositions and Table 13 shows the physical properties of the products.

TABLE 12

| Composition No. | 1,4-Butylene glycol (kg) | 2-Butyl-2-ethyl-1,3-propanediol (kg) | Neopentyl glycol (kg) | Adipic acid (kg) |
| --- | --- | --- | --- | --- |
| c | 47.9 | — | — | 52.1 |
| d | — | 62.1 | — | 37.9 |
| e | — | — | 50.7 | 49.3 |

TABLE 13

| Composition No. | Diol | Acid value (KOH mg/g) | Hydroxyl value (KOH mg/g) | Water content (%) | Number-average molecular weight |
|---|---|---|---|---|---|
| c | 1,4-Butylene glycol | 0.01 | 55.5 | 0.020 | 2,020 |
| d | 2-Butyl-2-ethyl-1,3-propanediol | 0.03 | 54.7 | 0.021 | 2,050 |
| e | Neopentyl glycol | 0.02 | 54.9 | 0.018 | 2,045 |

Industrial Applicability

The present invention provides a polyurethane having excellent hydrolysis resistance, weatherability, alkali resistance, etc. Said polyurethane is useful as a material for extrusion molding products such as hoses, tubes, films, sheets, belts, and rolls, a material for injection molding products such as packing materials, mechanical parts, and automobile parts, a material for artificial leathers, and coating materials such as paints, etc.

We claim:

1. A polyurethane having a polyester polyol in the molecule, said polyester polyol having the structural unit represented by formula (I):

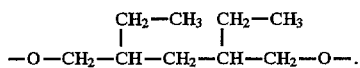

(I)

2. The polyurethane according to claim 1, wherein the polyurethane has the weight-average molecular weight of 60,000–500,000.

3. A process for producing the polyurethane according to claim 1, which comprises subjecting a diol containing 30% or more 2,4-diethyl-1,5-pentanediol and a dicarboxylic acid to dehydration polycondensation to obtain a polyester polyol having a number-average molecular weight of 400–8,000, and then reacting the polyester polyol with a polyisocyanate in the presence of a low molecular weight compound having two or more active hydrogen atoms to obtain the polyurethane.

4. The process according to claim 3, wherein said dicarboxylic acid is a member selected from the group consisting of succinic acid, adipic acid, azelaic acid, maleic acid, fumaric acid and phthalic acid.

5. The process according to claim 3, wherein said polyisocyanate is a member selected from the group consisting of aromatic diisocyanate, alicyclic diisocyanate and aliphatic diisocyanate.

6. The process according to claim 3, wherein said low molecular weight compound having two or more active hydrogen atoms is a diol or a diamine.

7. The process according to claim 6, wherein said diol is a member selected from the group consisting of ethylene glycol, propylene glycol, 1,4-butylene glycol and 1,6-hexanediol.

8. The process according to claim 6, wherein said diamine is propylene diamine.

* * * * *